March 25, 1958 E. V. PAOLICELLI 2,828,402
ELECTRIC HEATER FOR BURN-IN KNIVES
Filed Nov. 5, 1956 2 Sheets-Sheet 1
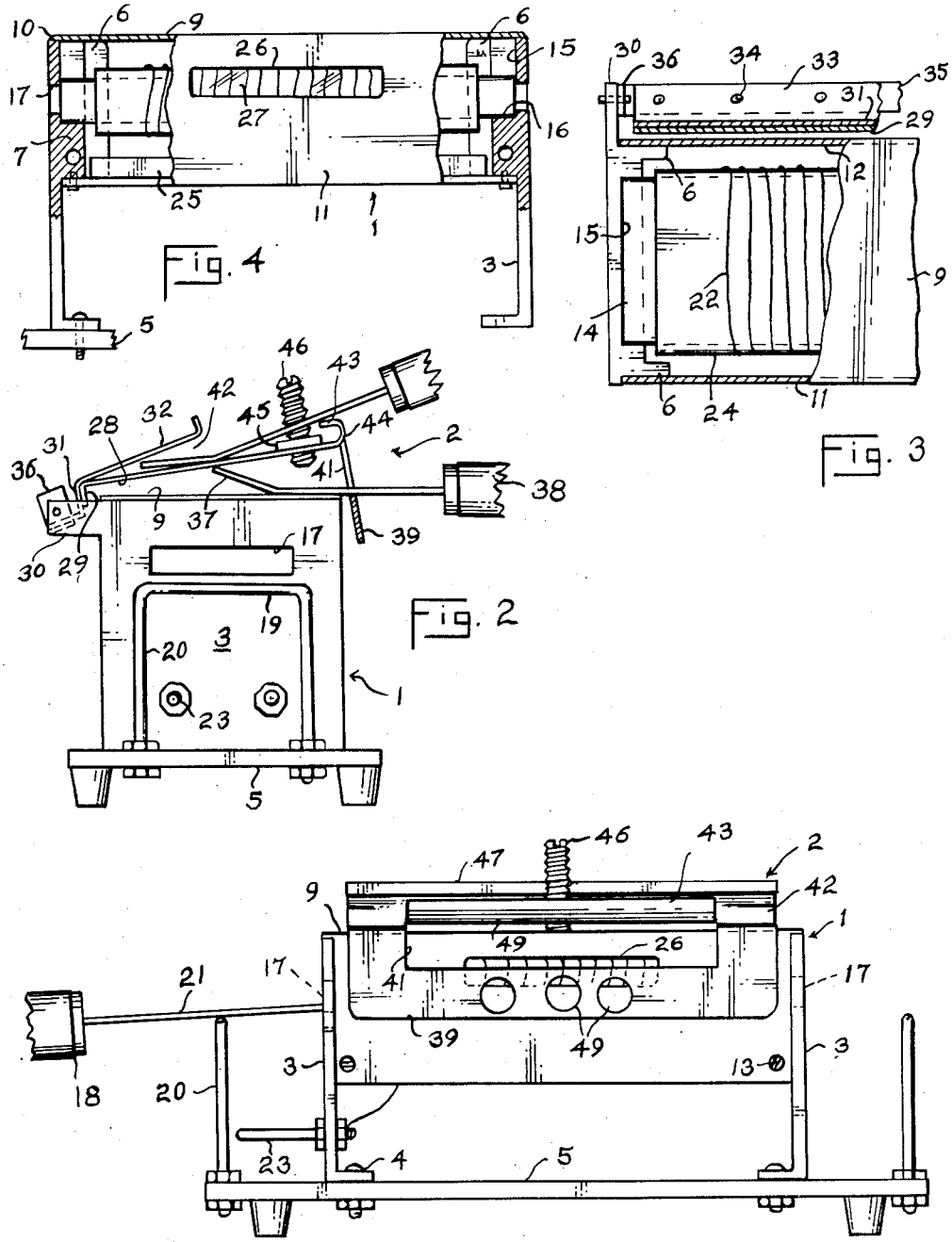
INVENTOR.
EUSTACE V. PAOLICELLI
BY Nicholas J. Garofalo
ATTORNEY March 25, 1958  E. V. PAOLICELLI  2,828,402
ELECTRIC HEATER FOR BURN-IN KNIVES
Filed Nov. 5, 1956  2 Sheets-Sheet 2
Fig. 6
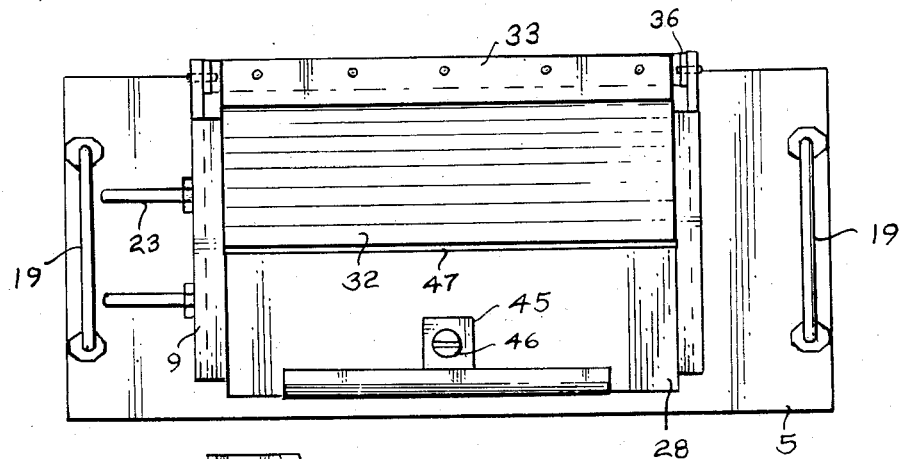
Fig. 7
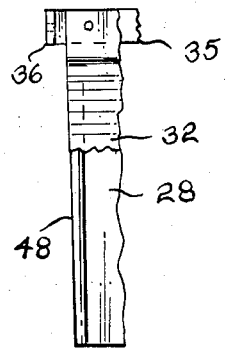
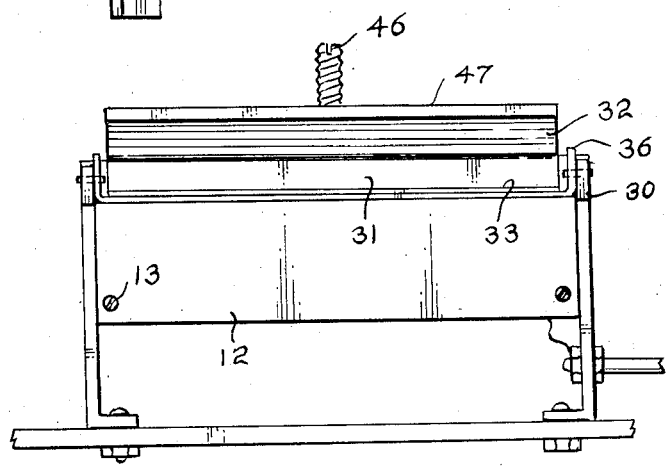
Fig. 5
INVENTOR.
EUSTACE V. PAOLICELLI
BY Nicholas J. Garofalo
ATTORNEY

United States Patent Office 2,828,402
Patented Mar. 25, 1958

2,828,402

ELECTRIC HEATER FOR BURN-IN KNIVES

Eustace V. Paolicelli, Elmhurst, N. Y.

Application November 5, 1956, Serial No. 620,535

12 Claims. (Cl. 219—35)

This invention pertains to new and useful improvements in devices for heating burn-in knives.

Burn-in knives are used extensively in the furniture industry in effecting the repair or concealment of scratches, dents, and the like in finished furniture. In general, this process involves heating a burn-in knife to a desired temperature. The heated knife is used in melting or softening a suitable substance used to fill a defect. The affected surface is then smoothed over by the knife and finished in proper manner.

In a busy furniture finishing and repair shop a worker will in the course of a day repeatedly heat a plurality of knives. A number of knives are placed in a heating device or oven, so that as the knife being used cools, others will be ready for use. It is desirable to have in the heating device available for use a number of knives having various temperatures, so that according to the needs of a particular project a worker may select a hot knife, a warm knife, or a knife having some other temperature.

It is accordingly an object of this invention to provide an improved and practical heating device for burn-in knives, which is efficient in operation for the use intended, is compact in structure, has a minimum of parts, and is economical to make.

A further object of this invention is to provide a heating device for burn-in knives, which is adapted to accommodate at one time a plurality of knives in a manner so that the knives will acquire various temperatures, and the temperature which any particular knife will develop may be selected and predetermined.

A more particular object of this invention is to provide an attachment for the heating unit of a burn-in knife heating device which is adapted to accommodate in various positions with respect to the heating unit a plurality of burn-in knives whereby various temperatures will develop in the knives.

A still further particular object of this invention is to provide visible means for determining whether the heating device is electrically on or off.

The invention further lies in the particular construction and general arrangement of its component parts as well as in their cooperative association with one another to effect the results intended herein.

The foregoing and other objects and advantages of the invention will appear more fully hereinafter from a consideration of the detailed description which follows, taken together with the accompanying drawing wherein an embodiment of the invention is illustrated. It is to be expressly understood, however that the drawing is for purposes of illustration and description, and is not to be construed as defining the limits of the invention.

In the drawings:

Fig. 1 is a front elevational view of a burn-in knife heating apparatus embodying the invention;

Fig. 2 is a left end view of Fig. 1;

Fig. 3 is a fragmentary top plan view of the apparatus;

Fig. 4 is a front elevational view of the heater unit with portions cut away;

Fig. 5 is a rear elevational view of the apparatus;

Fig. 6 is a top plan view of the apparatus; and

Fig. 7 is a detail directed to an end of the lower plate of the attachment.

Reference is now directed to the several drawings wherein there is shown an apparatus embodying the invention, a burn-in knife heater unit 1 to which is pivoted an overlying attachment or accessory 2.

The heater unit comprises an elongated housing of rectangular proportions and metal construction, having a pair of upright opposed end walls 3 mounted by foot lugs and fasteners 4 to the surface of a baseboard 5. Formed on the inner face of each end wall is a pair of inwardly extending ears 6 which are bridged at the bottom by an integral thick block or transverse rib 7. Horizontally disposed between the end walls is a bottom panel or wall 8 of the housing, which is fastened at its ends to the undersides of the blocks 7. The housing is closed over at the top by a horizontally disposed rectangular wall or panel 9. The latter is flat, and rests at its ends 10 upon the tops of the end walls 3. The front and rear sides of the housing are respectively closed over by panels 11 and 12 which depend integrally from the longitudinal edges of the top wall 9 and are fastened as at 13 to the ears 6.

Supported within the housing between the end walls is a horizontally disposed open ended rectangular tube 14. The marginal ends of the latter are positioned in channels 15 formed between the ears 6 of the end walls and rest upon shoulders 16 formed at the bottoms of the channels by the block portions 7. The open ends of tube 14 register with complementary rectangular openings 17 formed through the end walls 3. The tubular member 14 is formed of metal having good heat conducting properties, such as Monel. When heated, it serves as an oven into the open ends of which burn-in knives 18 may be inserted and heated. A transverse rail 19 having depending legs 20 rigidly anchored to the baseboard 5 is located opposite each end opening 17. The rails 19 serve as rests for the shank portions 21 of knives inserted into the oven.

The oven or tube 14 is heated by an electric element or coil 22 wound about its central area. The free ends of the coil are connected to terminal plugs 23 suitably mounted to the lower portion of one of the end walls 3. The coil is properly protected by insulating material 24 from short circuit contact with the oven tube. The tubular member 14 and the electric coil about it are located within the housing in spaced relation to the top and side wall panels to avoid short circuiting of the coil. The function of the heating coil 22 is to transmit heat not only to the oven but also to the top wall 9 spaced closely above. A block of heat insulating material 25, such as asbestos, covers the upper surface of the bottom wall. The baseboard 5 is also formed of heat insulating material.

As a safety measure, so that the operator may readily see whether the heating coil is energized or functioning, an elongated window 26 is formed in the front panel 11 of the housing. The window or cutout is closed over by a transparent non-combustible material, such as mica sheeting 27 through which the glow of the coil is plainly visible when the latter is energized. The window is desirably located opposite the coil element.

Considerable heat develops in the Monel formed oven tube 14, so that burn-in knives inserted therein develop a high temperature, becoming very hot. A hot knife is desirable in certain operations in repairing furniture defects, particularly in melting a shellac stick or the like used for filling cavities. However, other repair operations require knives having lower temperatures. It is, accordingly, desirable to have ready for selective use a plurality of knives having various temperatures. To this end, the attachment or accessory 2 is associated with the heater unit 1.

This attachment overlies the top wall 9 of the heating unit and is pivoted to the housing of the latter so that it may be pivoted from a normal position lying on the top wall to a plurality of angular positions away from the latter wall. The attachment includes a flat lower plate 28 of rectangular proportions and being substantially the length of the top wall 9 and slightly wider. Longitudinally of the rear edge of plate 28 is a depending narrow flange 29 which is unitary with or fixed to a complementary depending flange portion 31 of an upper or overhead angularly disposed second plate 32. The flange 31 of the latter has a horizontally extending offset portion 33 which is made fast by rivets 34 to a hinge bar 35. The latter is pivoted by a pair of end ears 36 to a pair of ears 30 extending rearwardly from the end walls 3 of the heater unit. By this hinged association the attachment 2 may be pivoted from a position wherein the lower plate 28 thereof lies flat on the top wall 9 of the heater unit to a position clear of the latter wall and depending opposite the rear panel 12 of the heater unit.

The lower plate 28 of the attachment lies in a normal position flat on the top wall of the heater unit. The working or free end 37 of a burn-in knife may be inserted from the front of the heater unit underneath plate 28 so as to rest upon the top wall 9. Accordingly, heat conducted through the latter will heat the knife blade. In this position of the knife the handle 38 and a portion of the shank project to the outside as in Fig. 2. Due to the weight of the blade and handle, the free end of the knife will tilt the pivoted overlying plate 28 upwardly, and as it does so it will drop out from beneath the latter. To avoid this dropping of the knife, the plate 28 is provided with a flange or apron piece 39 depending along its front edge. In normal position this flange hangs down opposite the front panel 11. It is provided with an elongated narrow slot 41 through which knives may be inserted between plate 28 and the top wall 9. By means of this slotted flange structure a heavy knife will be prevented from dropping away from underneath the plate 28. In the case of a knife inserted through the slot 41, the projecting shank and heavy handle of the knife will tilt plate 28 upwardly. In this action the lower edge of the slot limits against the underside of the shank of the knife which is pressing downward. Accordingly, the plate 28 will be restrained against pivoting further in an upward direction, and the knife will be restrained in the slot 41 and between the plate 28 and top wall 9 and thus prevented from dropping away.

It is obvious that heat from the coil 22 will be conducted through the top wall to the lower plate 28 of the attachment 2 as well as to the knife blade. Accordingly, knives inserted beneath plate 28 will develop a lesser temperature than knives inserted directly into the oven member 14. The slot 41 is elongated so as to allow several knives to be inserted therethrough in comfortable side by side relation.

To obtain knives having a lesser temperature than those placed either in the oven or beneath plate 28, the angularly disposed upper plate 32 of the attachment is provided. This plate is coextensive in length with the lower plate 28, but is preferably narrower. It extends at a low angle forwardly above the lower plate to a point about midway of the latter and forms an angular space 42 above plate 28. The free end of a burn-in knife may be inserted into this space from either the ends or the front of the attachment. A rest for the shank of a knife inserted from the front into this space is provided by an upwardly extending lip 43 formed along the upper edge of the slot 41. This lip is a continuation of plate 28. It provides a curved underside 44 (Figs. 1, 2) which serves as a guide facilitating insertion of the free end of a knife blade below plate 28.

It is understandable that knives inserted in the upper space 42 will acquire a lower temperature than will knives inserted in the oven 14, or beneath the plate 28.

Means is provided for adjusting the angular position of the attachment 2 relative to the top wall 9 of the heater unit. By this means a greater or lesser space may be provided between the top wall 9 and plate 28. As a consequence, the temperature to which knives inserted beneath plate 28 as well as beneath plate 32 may be further controlled. To this end, plate 28 is provided with a thickened central area or boss 45 which has a through hole in which is threaded an adjusting screw 46. The latter is operable by a screw driver or the like engaging a screw driver slot 46 in the end of the screw. When the screw is threaded inwardly, it will abut the top wall 9 and cause the attachment 2 to pivot upwardly; and when threaded in the reverse direction, the attachment will pivot down upon the top wall. It is understandable that the attachment 2 may be pivoted angularly until it depends at the rear of the heater unit. This condition clears the top wall 9 and permits the surface of the latter to be used for heating a glue spot.

The upper plate 32 is provided with an upturned strengthening rib 47 along its outer edge. Plate 28, which is subject to considerable heat, may be provided with strengthening ribs 48 along its ends, as indicated in Fig. 7, to prevent possible buckling of the plate.

The window 26 earlier mentioned is a safety measure to avoid possible dangerous accidents. It enables the operator to visibly determine whether the coil 22 is "on" or "off." It is, therefore, desirable that this view will at all times be unobstructed. Hence, the apron flange 39 of the lower plate 28 is provided with a number of cutouts 49 which will continue to allow a clear view of the window regardless of the angular disposition of the attachment and the apron 39.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described but also in all such forms and modifications as may reasonably be construed to fall within the spirit of the invention and the scope of the appended claims.

I claim:

1. In a burn-in knife heating apparatus including an elongated oven member, heating means associated with the oven for transmitting heat thereto, and a housing enclosing the oven having a heat conductive rectangular flat top wall overlying the oven, a heat conductive rectangular plate overlying the top wall and pivoted at one edge to the housing to allow angular movement of the plate upwardly from the top wall, a flange depending from the edge of the plate opposite to the pivoted edge and having a slot allowing insertion therethrough of the free end of a burn-in knife to a position between the plate and top wall.

2. In apparatus as defined in claim 1, wherein a second heat conductive plate angularly overlies the rectangular plate, being unitary along one edge with the latter and having its opposite edge disposed angularly above the flanged edge of the rectangular plate, the angular space formed between the two plates serving to receive the free end of a burn-in knife.

3. In apparatus as defined in claim 2, wherein an upwardly extending lip is formed along the said opposite edge of the rectangular plate, the lip serving as a rest for the shank portion of the blade of a knife inserted into the said angular space.

4. In apparatus as defined in claim 1, wherein the upper edge of the slot is defined by the curved underside of an upwardly curving lip whereby insertion of the free end of a burn-in knife through the slot and beneath the rectangular plate is facilitated.

5. In apparatus as defined in claim 1, wherein the pivoted edge of the rectangular plate is characterized by an offset flange unitary therewith, and a hinge bar pivoted at its ends to the housing and being unitary with the offset flange.

6. In apparatus as defined in claim 2, wherein the rectangular plate is provided with a thickened portion centrally thereof, an elongated screw threadable through a hole of the thickened portion into abutment with the top wall, whereby the rectangular plate is angularly adjustable relative to the top wall.

7. In apparatus as defined in claim 1, wherein the housing includes a window through which the heat condition of the oven is visible, the depending flange depends in front of the said window and has a plurality of cutouts registrable with the window whereby visibility through the window is unobstructed by the said flange.

8. In a burn-in knife heating apparatus for heating to various temperatures a plurality of burn-in knives disposed in various areas thereof, an elongated housing of rectangular proportions having front and rear panels, end panels, and a top panel of heat conductive material, a tubular oven element of heat conductive material within the housing and supported between the end panels in close spaced relation to the top panel, an electric heating coil wound about the tubular element and electrically insulated therefrom, the heating coil serving to heat both the tubular element and the top panel, the tubular element having open ends registering with complementary openings through the end panels through which openings burn-in knives are receivable into the interior of the tubular element, and a window opening through one of the panels of the housing opposite the heating coil so as to provide an outside view of the latter, wherein a rectangular heat conductive plate separate from the top panel overlies the latter and is pivotally connected along a rear portion thereof with the housing whereby it may be pivoted from a position flat upon the top panel to a plurality of angular positions above so that burn-in knives may be inserted beneath the same.

9. In apparatus as defined in claim 8, wherein the plate carries along its front edge a depending flange having a slot through which the free end of a burn-in knife blade may be inserted to a position between the plate and the top panel of the housing, the plate being pivotable upwards under the weight of the knife and the underedge of the slot limiting against the underside of the shank of the knife whereby further upward pivoting of the plate is restrained.

10. In apparatus as defined in claim 9, wherein the upper edge of the slot is defined by the rounded underside of an upwardly curved lip which rounded edge serves to facilitate insertion of the blade end of the knife through the slot and beneath the rectangular plate.

11. In apparatus as defined in claim 9, wherein a second heat conductive plate overlies the rectangular plate and is unitary at its rear edge with the latter, the second plate providing an angular space between it and the rectangular plate into which the free end of the blade of a burn-in knife may be inserted, and wherein the upwardly curved lip serves as a rest for the shank portion of the knife.

12. In apparatus as defined in claim 9, wherein the flange normally depends substantially opposite the window and is provided with a number of cutouts registrable with the window.

References Cited in the file of this patent
UNITED STATES PATENTS

| | | |
|---|---|---|
| 926,714 | Bradley | June 29, 1909 |
| 932,539 | Denhard | Aug. 31, 1909 |
| 1,293,171 | Nimmerfroh | Feb. 4, 1919 |
| 1,616,544 | Paolicelli | Feb. 8, 1927 |
| 1,917,305 | Johnson | July 11, 1933 |
| 2,708,705 | Davis | May 17, 1955 |
| 2,724,765 | Braxter | Nov. 22, 1955 |